United States Patent
Khajepour et al.

(10) Patent No.: US 10,941,024 B2
(45) Date of Patent: Mar. 9, 2021

(54) APPARATUS FOR CONTROLLING A MOBILE PLATFORM

(71) Applicant: Amir Khajepour, Waterloo (CA)

(72) Inventors: Amir Khajepour, Waterloo (CA); Sergio Torres Méndez, Puebla (MX)

( * ) Notice: Subject to any disclaimer, the term of this patent is extended or adjusted under 35 U.S.C. 154(b) by 0 days.

(21) Appl. No.: 14/613,450

(22) Filed: Feb. 4, 2015

(65) Prior Publication Data

US 2015/0217975 A1    Aug. 6, 2015

Related U.S. Application Data

(60) Provisional application No. 61/935,894, filed on Feb. 5, 2014.

(51) Int. Cl.
| B66C 21/00 | (2006.01) |
| B25J 9/00 | (2006.01) |
| B65G 1/04 | (2006.01) |

(52) U.S. Cl.
CPC .............. B66C 21/00 (2013.01); B25J 9/0078 (2013.01); B65G 1/04 (2013.01)

(58) Field of Classification Search
CPC ......... B66C 13/23; B66C 21/00; B66C 21/08; B66C 21/10; B25J 9/0078; B65G 1/04
USPC .......................................................... 254/292
See application file for complete search history.

(56) References Cited

U.S. PATENT DOCUMENTS

| 3,065,861 | A | * | 11/1962 | Cruciani | B66C 21/00 212/197 |
| 3,333,713 | A | * | 8/1967 | Cruciani | B66C 21/00 104/112 |
| 5,585,707 | A | * | 12/1996 | Thompson | B25J 5/00 318/568.1 |
| 6,975,089 | B2 | * | 12/2005 | Rodnunsky | B66C 13/08 104/180 |
| 7,172,385 | B2 | * | 2/2007 | Khajepour | B25J 17/0266 414/735 |
| 7,239,106 | B2 | * | 7/2007 | Rodnunsky | B66C 13/08 212/83 |
| 7,367,771 | B2 | * | 5/2008 | Khajepour | B25J 17/0266 414/735 |
| 7,367,772 | B2 | * | 5/2008 | Khajepour | B25J 17/0266 414/735 |
| 7,753,642 | B2 | * | 7/2010 | Bosscher | B25J 17/0266 414/735 |
| 8,909,379 | B2 | * | 12/2014 | Fisher | B66C 21/00 472/80 |
| 9,308,652 | B2 | * | 4/2016 | Pehlivan | B25J 17/0266 |
| 2004/0146388 | A1 | * | 7/2004 | Khajepour | B25J 17/0266 414/680 |
| 2007/0113699 | A1 | * | 5/2007 | Khajepour | B25J 17/0266 74/490.03 |

(Continued)

*Primary Examiner* — Sang K Kim
*Assistant Examiner* — Nathaniel L Adams
(74) *Attorney, Agent, or Firm* — Gowling WLG (Canada) LLP; Jeffrey W. Wong

(57) ABSTRACT

A system and apparatus for controlling a mobile platform via cables is disclosed. Each of the set of cables are connected at one end to the platform at a second end to a cable controlling mechanism, the cable controlling mechanism including a motor to control a length and tension of the cable. At least two of the cables form a constraint, such as a kinematic constraint to the apparatus in order to limit the movement of the platform in certain degrees of freedom.

19 Claims, 18 Drawing Sheets

(56) References Cited

U.S. PATENT DOCUMENTS

| | | | |
|---|---|---|---|
| 2007/0113700 A1* | 5/2007 | Khajepour | B25J 17/0266 74/490.03 |
| 2012/0298937 A1* | 11/2012 | Fisher | B66C 11/16 254/283 |
| 2013/0164107 A1* | 6/2013 | Pehlivan | B25J 17/0266 414/732 |
| 2014/0331808 A1* | 11/2014 | Reid | B25J 9/0078 74/490.04 |
| 2016/0090248 A1* | 3/2016 | Worsley | B65G 61/00 414/398 |

* cited by examiner

APPARATUS FOR CONTROLLING A MOBILE PLATFORM

CROSS-REFERENCE TO RELATED APPLICATIONS

This application claims the benefit of U.S. Provisional Patent Application No. 61/935,894 filed Feb. 5, 2014.

FIELD OF THE DISCLOSURE

The disclosure is generally directed at a warehousing robot and, more specifically, is directed at a apparatus for controlling a mobile platform.

BACKGROUND OF THE DISCLOSURE

Global economic competition has motivated manufacturing industries to seek robots that perform faster movements, thereby reducing production time and cost and gaining a competitive advantage. There is a strong trend towards non-automotive robot applications; indeed, arc welding showed a 52% gain in units, followed by material handling with 51%. Similarly, there is a growing interest in robotic applications in warehousing and distribution industries. Several industrial tasks require fast and precise repetitive movements; for instance, packaging, warehousing, machine loading and unloading, assembly, part transference, and material handling. Those tasks are called pick-and-place operations (PPO) and deal with grasping an object at one specific point, moving it to another predetermined place and then releasing it.

In many warehousing systems, the items are placed on a platform after being grasped, or retrieved. Control of these platforms are typically manual via an operator.

Therefore, there is provided a novel method and apparatus for controlling a mobile platform.

SUMMARY OF THE DISCLOSURE

The current disclosure is directed at an apparatus for automatic and programmable controlling a platform to increase speed, and reduce undesired movement of the platform.

In one aspect of the disclosure, there is provided an apparatus for controlling movement of a platform comprising a platform, a set of cable controlling mechanisms, and a set of cables extending from the platform, each of the set of cables being attached at a first end to the platform and at a second end to one of the set of cable controlling mechanisms, wherein the set of cables provide a constraint to assist in control of the platform.

BRIEF DESCRIPTION OF THE DRAWINGS

Embodiments of the present disclosure will now be described, by way of example only, with reference to the attached Figures.

DETAILED DESCRIPTION

The current disclosure is directed at an apparatus for passive controlling unnecessary or undesired movement of a platform in selected degrees of freedom using kinematic constraints. The apparatus assists in systems, such as, but not limited to, warehousing robots. In use with cable-based warehousing robots, the apparatus provides a way for a user to passively limit or eliminate motion of the platform (atop which items may rest) from moving or rotating in degrees of freedom that are undesired (such as movements which may cause the platform to tip and the item to fall). In most systems, there is a desire to limit movement of the platform in only two of the typically, six, degrees of freedom. The current system may be implemented in systems which use either active or passive cables.

Figure 1A:
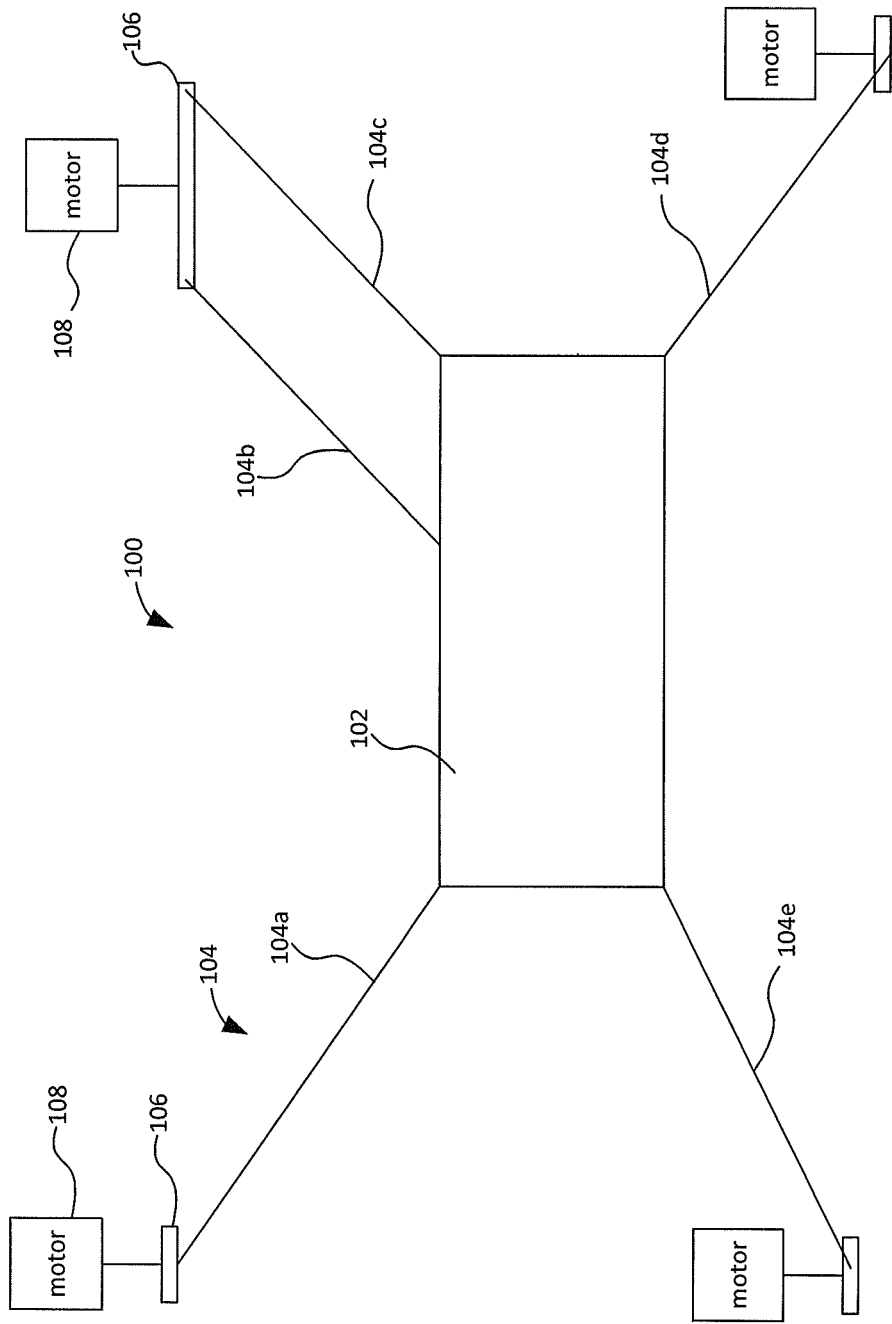
FIGS. 1a to 1e are schematic diagrams of cable systems for use in an apparatus for controlling a mobile platform.
Figure 1B:
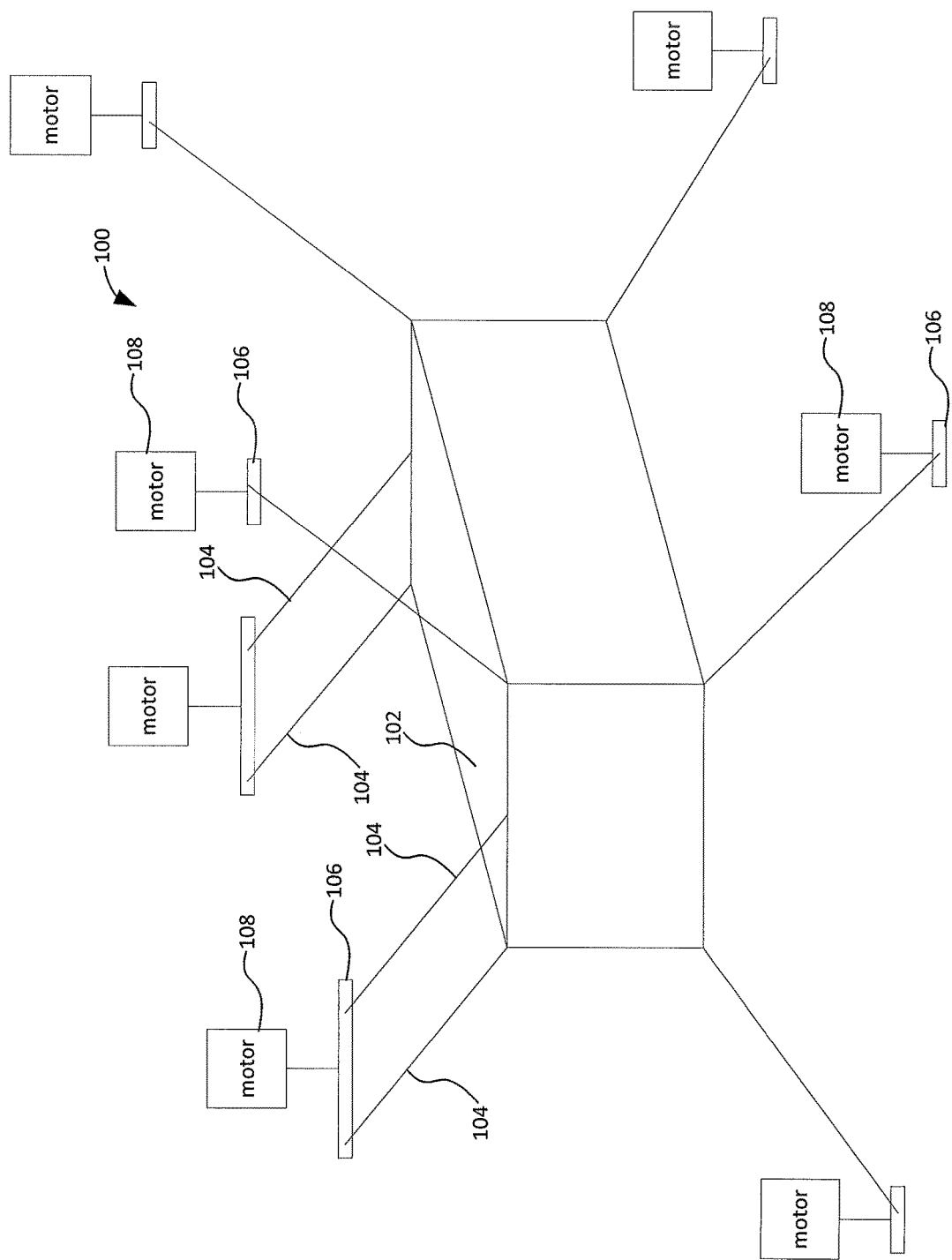
Figure 1C:
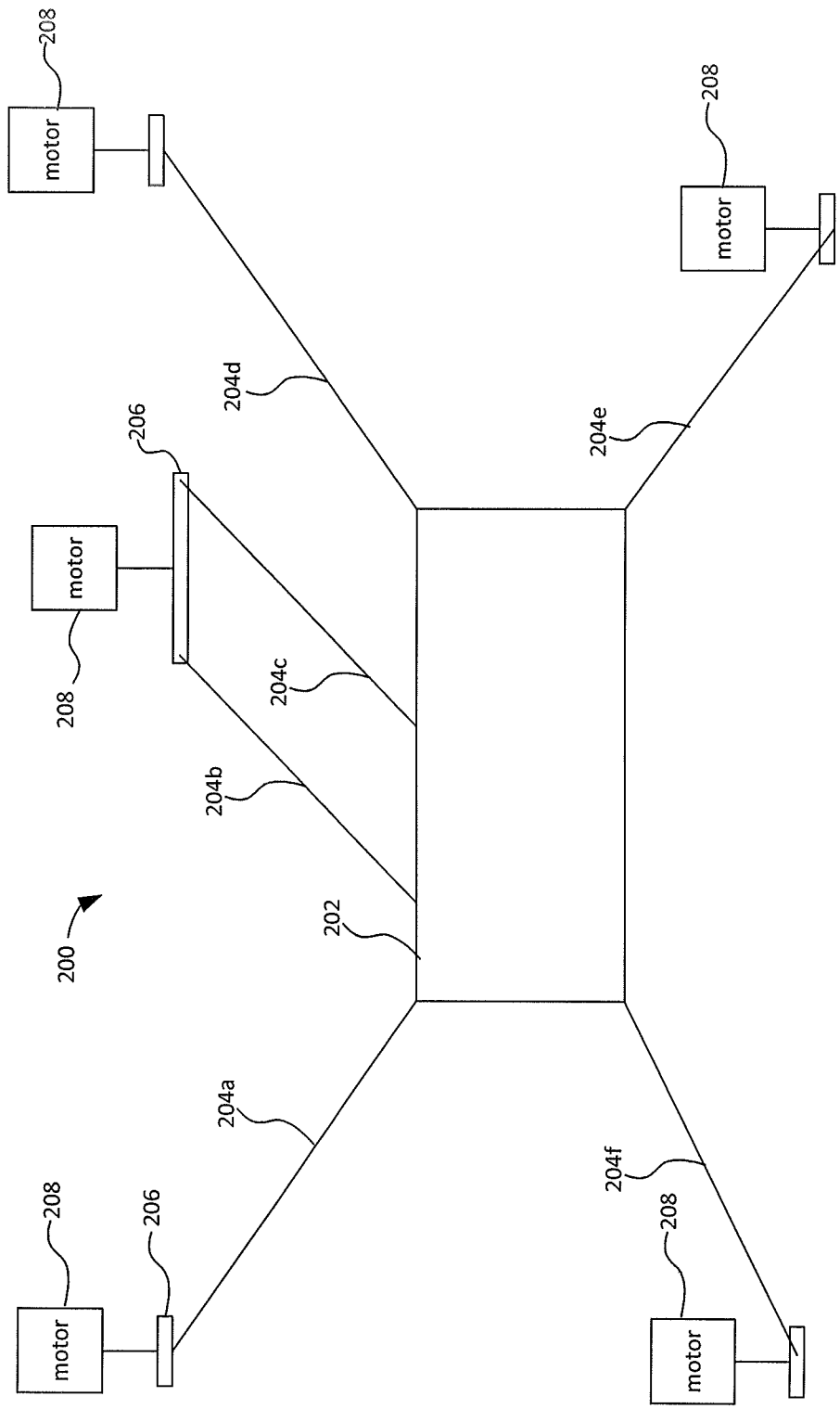
Figure 1D:
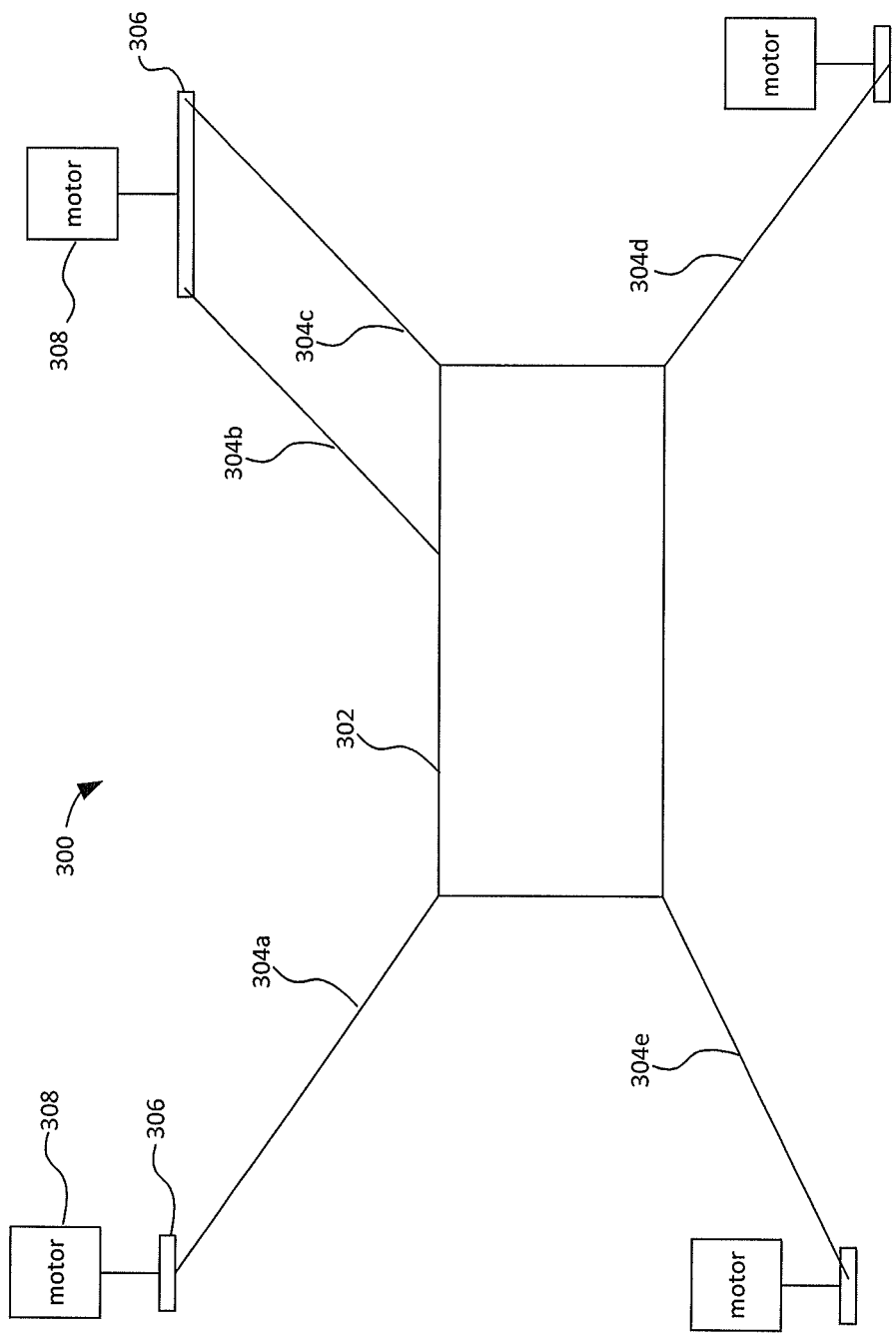
Figure 1E:
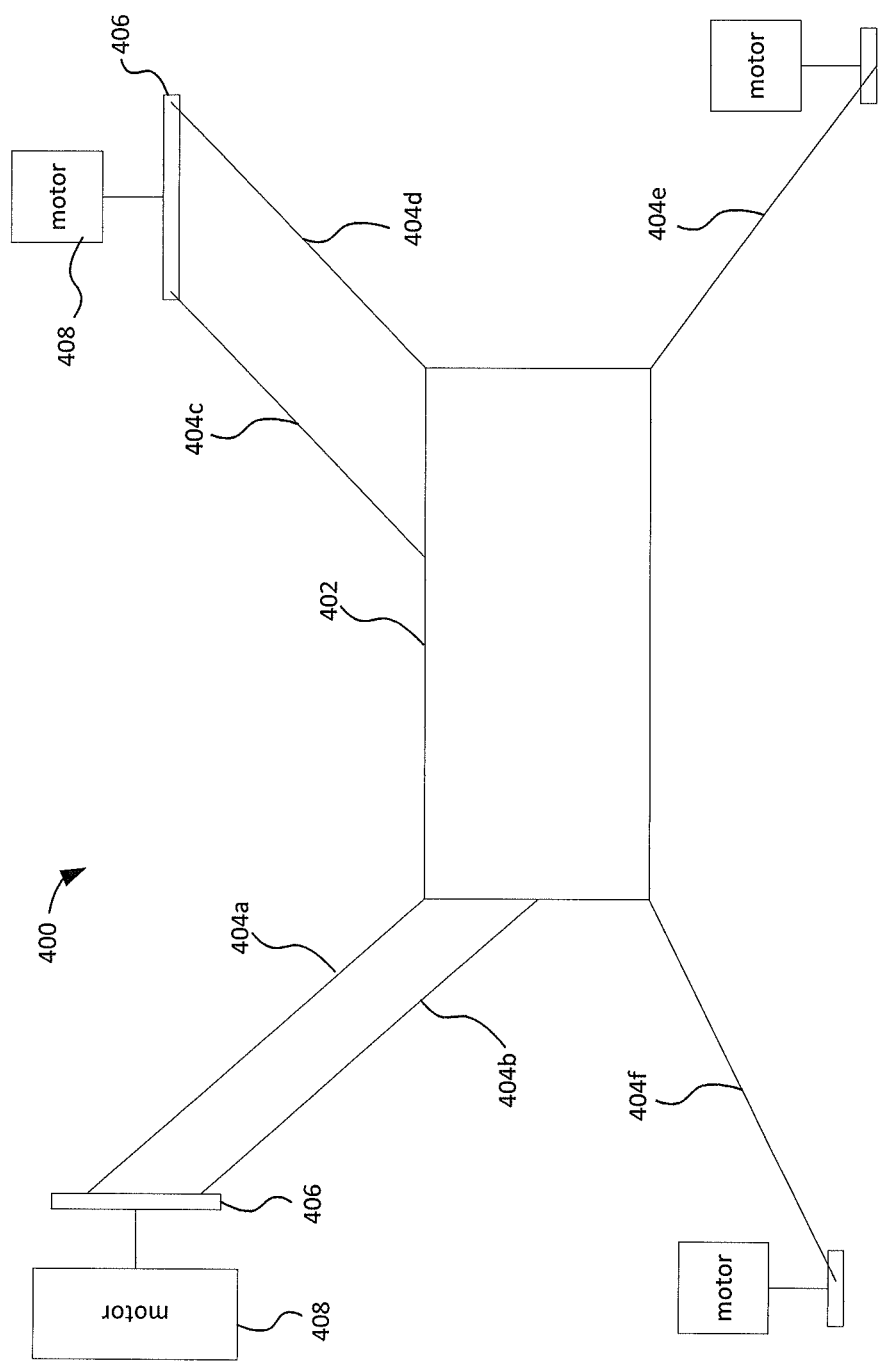
Figure 1F:
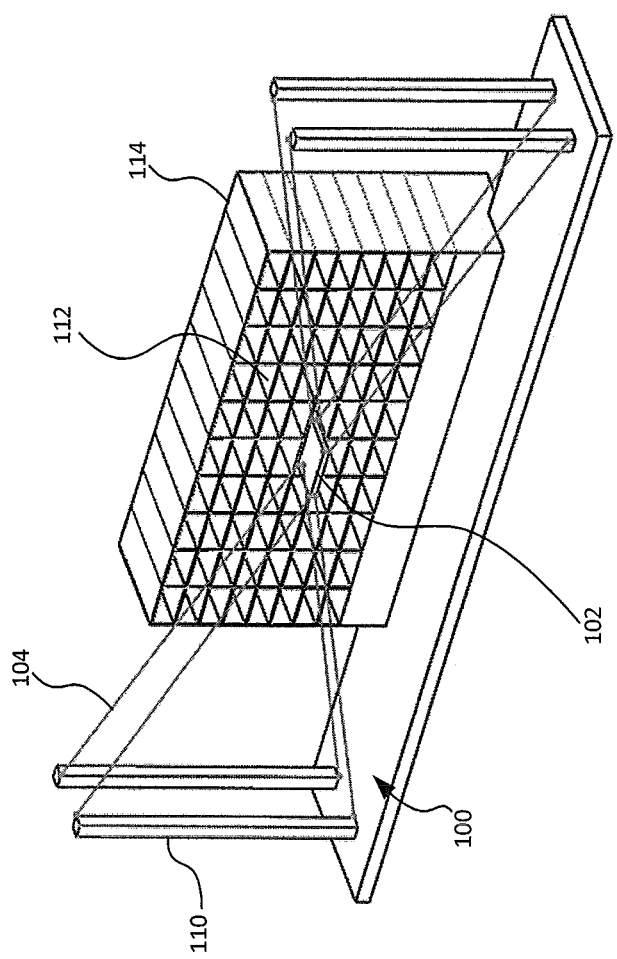
FIG. 1f is a perspective view of an apparatus for controlling a mobile platform.

Turning to FIG. 1e, a view of apparatus for controlling movement of a platform is shown. In the current embodiment, the apparatus 100 is a warehousing robot. The warehousing robot 100 includes a platform 102 from which a set of cables 104 extend. At one end, or a first end, of each cable 104, the cable 104 is connected to the platform 102 and at the opposite, or second end, the cable 104 is connected to a motor for controlling length or tension in the cable 104. The warehousing robot 100 may further include an apparatus, or cable controlling mechanism, for receiving and/or collecting the cable that is controlled by the motor, preferably a rotary motor. As schematically shown in FIG. 1f, the apparatus 100 may further include a frame 110 which supports the platform 102 and the cables 104. Although not shown, the cable controlling mechanism and the motor may be mounted within or to the frame 110. It will be understood that other components of the warehousing robot 100 are not shown as the disclosure is directed at apparatus for controlling undesired movement of the platform to reduce or prevent unwanted motion of the platform when the warehousing robot is in use.

A user can control the apparatus 100 to obtain items from the slots 112 of a shelving unit 114 located within a warehouse. Although not shown, the apparatus 100 may further include a robot arm or the like, which may be mounted or connected to the platform 102, to reach into the slots 112 to retrieve the item. After obtaining the item, the platform 102 is controlled to deliver the item to the user or a specific location. The delivery of the item will be understood by one skilled in the art.

In operation, when an item is requested, a signal is transmitted via a central processing unit (such as shown in FIG. 20) to the apparatus identifying the location of the requested item. The platform is then moved via the set of cables and the motors (and the cable controlling mechanism) to the identified location whereby the item is then retrieved and placed on the platform. In FIG. 20, in one embodiment, this apparatus (including the frame) may be placed between two shelving racks whereby one of these warehousing robots is used for one or both of the shelving racks. The following disclosure provides embodiments of cable systems for use in the control of the platform such that the platform does not move in undesired degrees of freedom. An example of calculations performed to determine required motor movements is also provided below.

Figure 10:
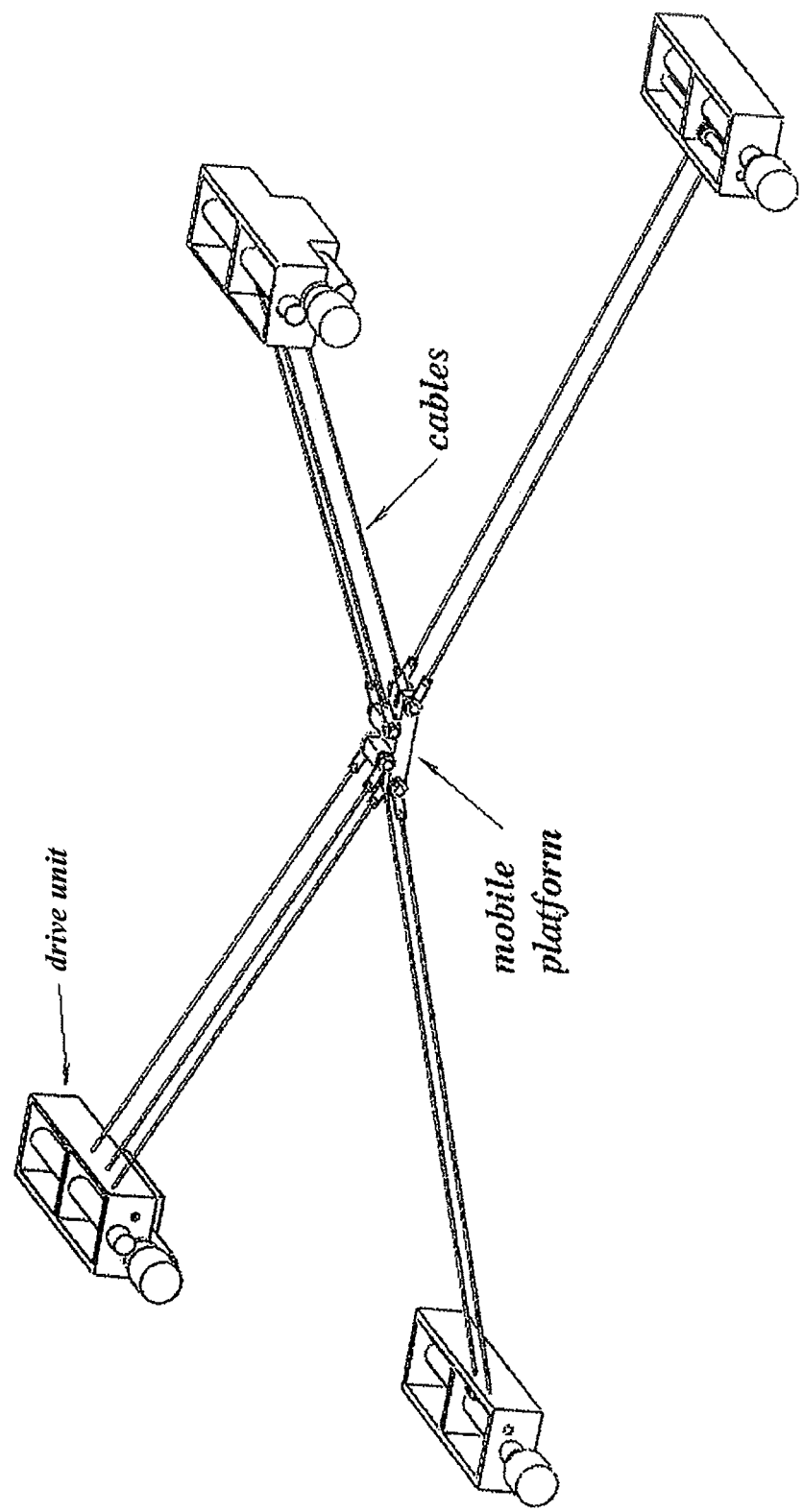
FIG. 10 is a perspective view of another embodiment of apparatus for controlling movement of a mobile platform.
Figure 11:
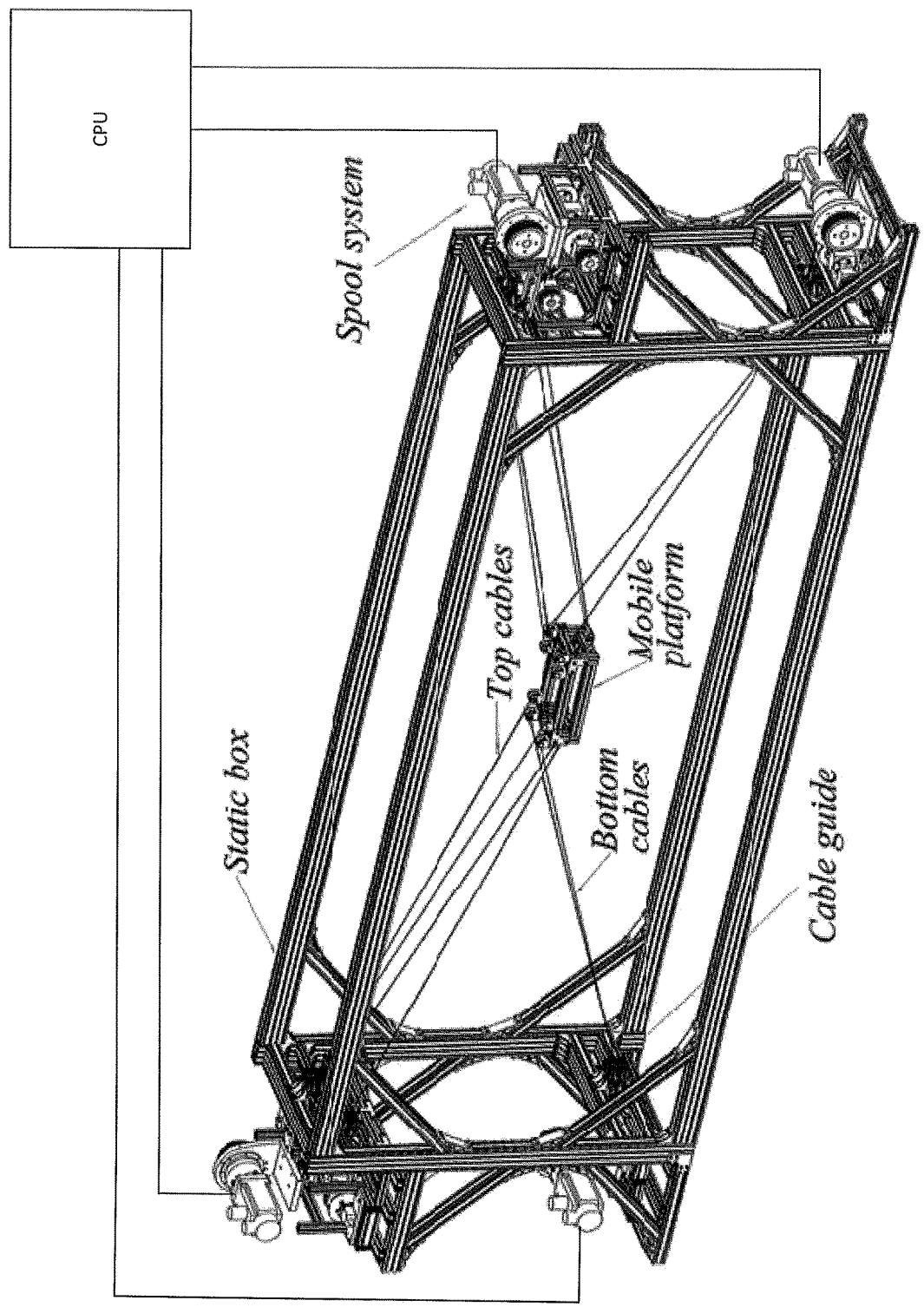
FIG. 11 is another embodiment of apparatus for controlling a mobile platform.

Turning to FIG. 1a, a schematic side view of the various parts of the apparatus 100 are shown. For ease of understanding, FIG. 1a provides a two-dimensional (2D) view of the apparatus. The disclosure with respect to FIG. 1a may also be applied to three-dimensional (3D) warehousing robot (such as schematically shown in FIG. 10).

In the embodiments of FIG. 1a to 1e or 10, the positioning and arrangement of the parallel cables provides kinematic constraints, in the form of parallelograms, to constrain motion of the platform to only desired motions. In a preferred embodiment, one motor or actuator is used for each parallelogram to keep the length of cables the same. Although not shown, the kinematic constraints may also be seen as parallelograms from a top or bottom view of the apparatus. In fact, the projection of the cables appearing to be in parallelograms may also observed from any of the sides of the apparatus and form kinematic constraints. In these embodiments, there are usually more motors/actuators than the number of degrees of freedom in order to keep the cables in tension. As a result, some of the motors are operable to control the lengths of the cables and the rest of the motors may be operable in torque or force mode to apply tension to the cables. In general the number of motors used in controlling the lengths of the cables should be equal to the number of degrees of freedom. For example, in the embodiments of FIGS. 1a to 1d, the motors or cable controlling mechanisms that are associated with the top portion of the cabling system may be considered to be operable to control the length of the cables while the motors or cable controlling mechanisms that are associated with the bottom portion of the cabling system are operable to control the tension in the cables to maximize the stiffness of the robot. This is described in more detail below. Although not shown and not preferred, the bottom cable controlling mechanism may be removed and gravity acting on the platform may be used to control the tension in the cables.

As shown in FIG. 1a, two of the cables 104b and 104c create a constraint in the form of a parallelogram. As can be seen, these cables are connected at a first end to the platform 102 and at a second end to a cable controlling mechanism 106 which in one embodiment can be a pulley system operating under the control of the motor 108. The motor 108 causes the cables in the constraint to move at an identical speed thereby maintaining the same cable lengths and thereby maintaining or keeping the parallelogram shape created between these cables 104, the platform 102 and the cable controlling mechanism or mechanisms 106.

In general operation, it is desirable that the platform only moves in two directions. The constraint or constraints allow(s) for improved control of the platform to reduce or prevent the platform from rotating or moving in one or more degrees of freedom that is or are not desired by the user or the system. Therefore, if the platform 102 is to move only in the vertical direction with respect to the shelving rack 114, the cable system reduces or prevents the platform from moving in the horizontal direction (towards or away from the shelving rack 114) and reduces or prevents the platform from rotating about itself thereby possibly dropping the item via constraints achieved through the cables. The constraint or constraints allow(s) for improved control of the platform by reducing or eliminating undesired degrees of freedom. This may also further reduce the number of motors required for controlling the platform.

FIG. 1b provides a schematic three-dimension (3D) view of the system of FIG. 1a. The system of FIG. 1b includes a number of constraints, seen as the parallelograms created by cables (as shown). Although, there are two clear parallelograms or constraints, depending on how the cable controlling mechanisms and motors are set up, if the cable controlling mechanisms associated with the constraints are themselves controlled by the same motor, a further constraint may be introduced to the apparatus 100 to provide further control of the platform 102. Although not shown, from a top view of the system, further constraints may be seen. It is preferred that the cables which form constraints are controlled by the same motor to keep the parallelogram shape.

Turning to FIGS. 1c to 1e, further 2D embodiments of how cables may be set up to provide a constraint are shown. It is assumed that identical sets of cables may be attached on an opposite side of the 3D platform which are completed hidden from the front view.

In FIG. 1c, the apparatus 200 includes a platform 202 and a set of four (4) cables 204 which support the four visible corners of the platform 202. These four cables 204a, 204d, 204e and 204f may be seen as the basic cabling required to control the apparatus without constraints. Each of the cables 204a, 204d, 204e and 204f is connected at one end to the platform 202 and at a second end to a rotary motor 208 which controls the length or tension of the individual connected cables via a cable controlling mechanism or pulley system 206. The apparatus 200 further includes a pair of cables 204b and 204c which are connected to another cable controlling mechanism 206 and a single motor 208 such that they are controlled by the same motor 208.

The constraint applied to the warehousing robot by cables 204b and 204c forms a parallelogram along with an edge of the platform 202 and their connection with the cable controlling mechanism. As discussed above, the motor 208 with the cable controlling mechanism 206 controls the length or amount of tension in the cables 204b and 204c. Since the two cables 204b and 204c are controlled by the same motor, their lengths will remain identical, therefore maintaining the parallelogram or constraint when the platform 202 is in motion to reduce the likelihood the platform can move in an undesired degree of freedom.

As will be understood, depending on the number of constraints being applied to the apparatus 100, the movement of the platform 202 may be controlled such that there is only movement in the desired degrees of freedom. In order to control more degrees of freedom or, in other words, to reduce or prevent movement of the platform 202 in these degrees of freedom, the number of cables may be increased as necessary.

Turning to FIG. 1d, the apparatus 300 of this embodiment includes a platform 302 and a set of cables 304. In the current embodiment, there are five (5) cables in the set of cables 304. The cables 304 are shown as 304a, 304b, 304c, 304d, and 304e. Each of the cables is attached at one end to the platform 302 and at a second end to a cable controlling mechanism 306. In the current embodiment, there are four (4) cable controlling mechanisms 306 in the set of cable controlling mechanisms. Although described separately, the cable controlling mechanism 306 may also be seen as including the motor 308.

In this embodiment, the constraint is provided by the parallelogram between cables 304b and 304c whereby cable 304c is one of the basic cables for holding up the platform 302. Unlike the previous example where the constraint was provided by separate cables apart from the base cabling, in this embodiment, the constraint is partially provided by at least one of the cables 304c which is part of the basic cabling.

Turning to FIG. 1e, the warehousing robot of this embodiment includes a platform 402 and a set of cables 404. In the current 2D embodiment, there are six (6) cables in the set of cables 404. The cables 404 are shown as 404a, 404b, 404c, 404d, 404e and 404f. Each of the cables are attached at one end to the platform 402 and at a second end to a cable controlling mechanism 406. In the current embodiment, there are four (4) cable controlling mechanisms in the set of cable controlling mechanisms 406. Each of the cable controlling mechanisms 406 may also include a motor 408 or the motor may be a separate part. The cable controlling mechanism 406 collects the ends of the cables.

In this embodiment, the constraint is provided by a pair of parallelograms between cables 404a and 404b and cables 404c and 404d whereby in each parallelogram, one of the cables (406b and 406d) being used is part of the basic cabling.

Figure 1G:
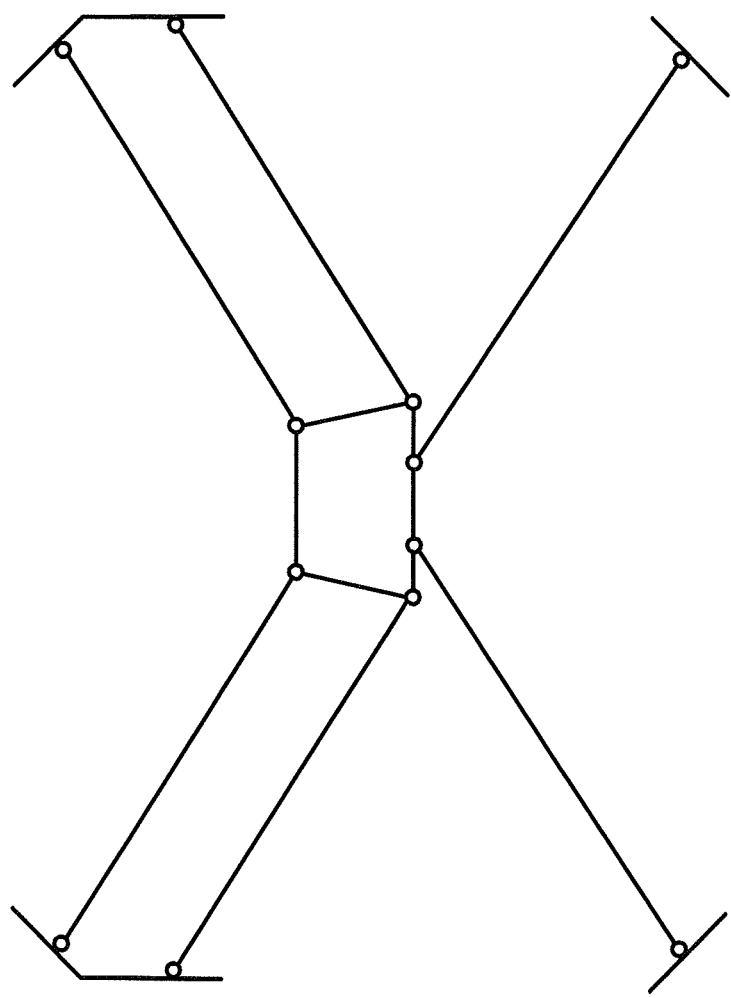
FIGS. 1g and 1h are schematic diagrams of embodiments of cable systems for use in the apparatus for FIG. 1f.
Figure 1H:
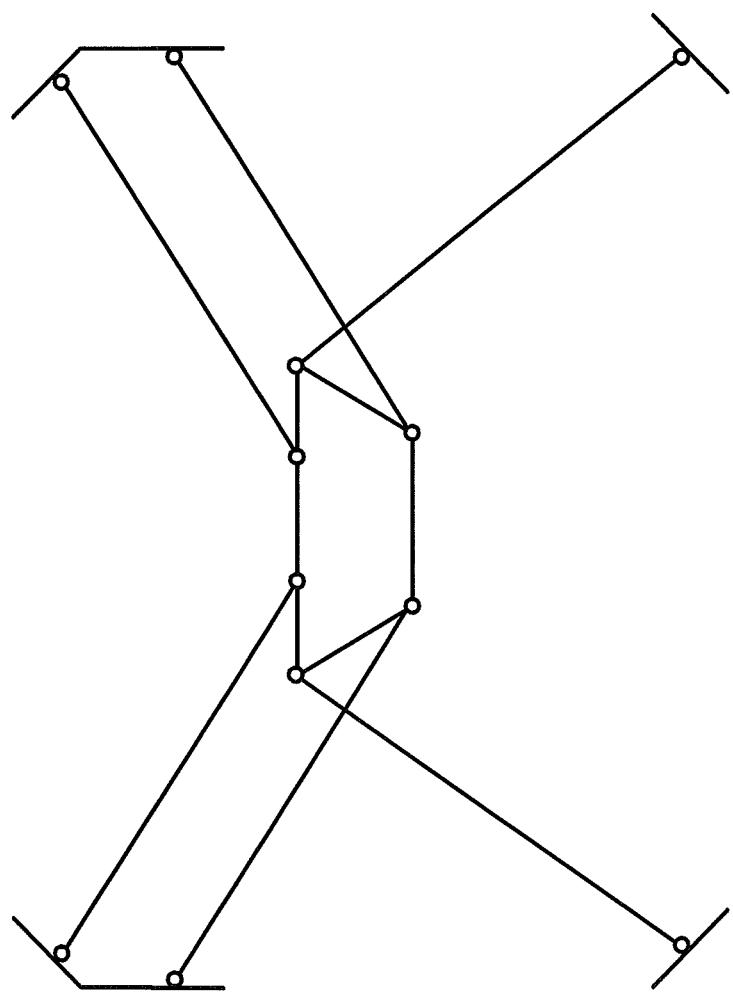

Further embodiments of cabling may also be used, such as, but not limited to, the systems shown in FIGS. 1g and 1h. As can be seen, the platforms do not have to be rectangular or symmetrical and may be of any shape. As long as the cables form a parallelogram, they will be able to serve as a constraint for controlling the mobile platform. As can further be seen in FIGS. 1g and 1h, the constraints do not have to be formed on an identical edge of the platform but can be on opposite sides (such as in Figure h), however it is clear that a parallelogram between those cables is still formed.

Figure 2:
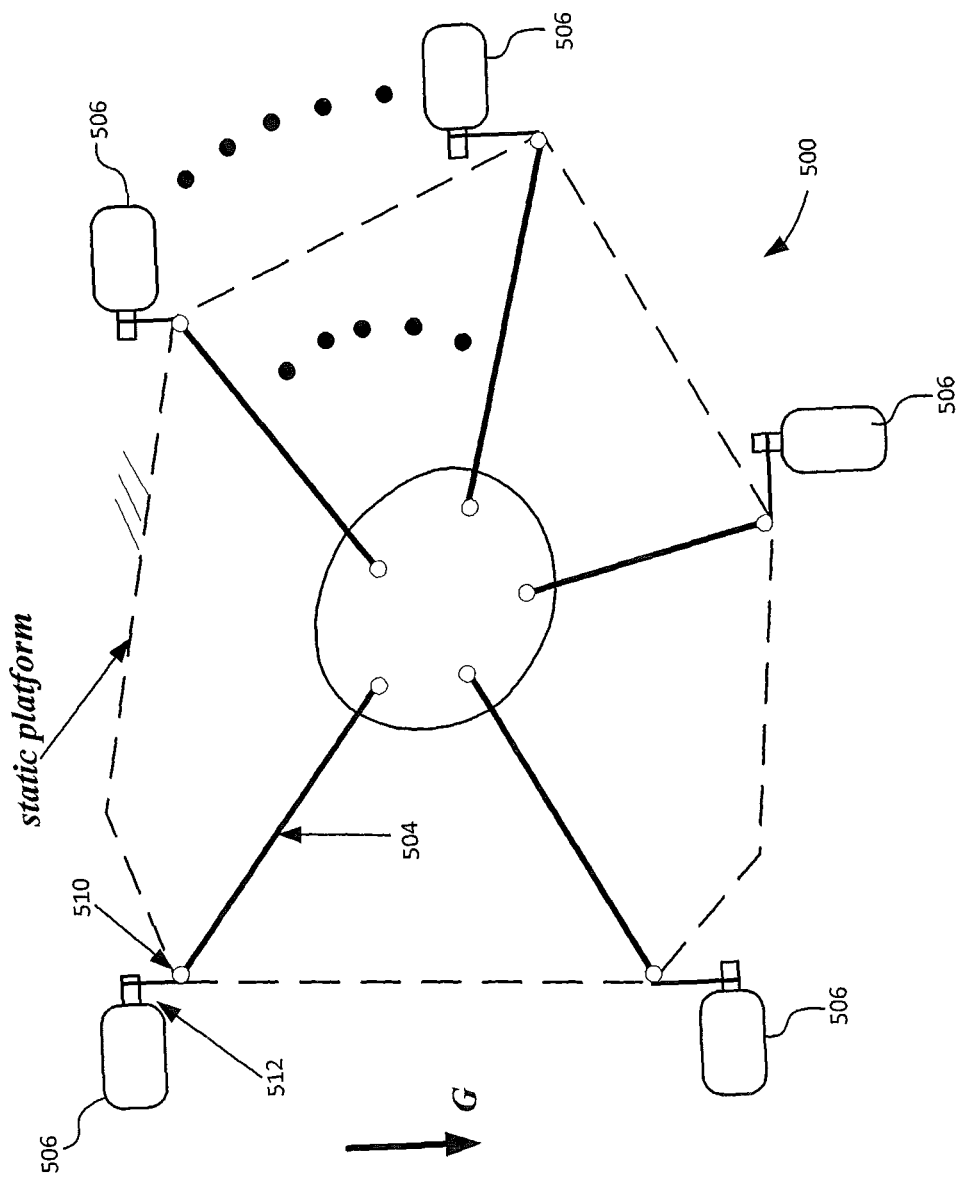
FIG. 2 is another embodiment of apparatus for controlling a mobile platform.

A mathematical model of a fully constrained cable-based apparatus is hereby discussed below. A schematic representation of such an apparatus 500 is presented in FIG. 2, where one end of each cable 504 is attached to a mobile platform 502 and the other side is connected to a drive unit 506 (which may be seen as the cable controlling mechanism). Typically, a drive unit or cable controlling mechanism includes one or more pulleys which guide the cable 504 to a drum which recollects/releases the cable in relation to the rotation of the shaft of the motor. Force sensors 510 or position sensors 512 or both may be added to measure the tension and length of each cable 504. The goal is to move the mobile platform 502 to a desired pose by simultaneously changing the cable lengths and at the same time maintaining a positive cable tension. The theoretical model of this system is formulated assuming that each cable is always under positive tension for a given pose of the mobile platform.

General kinematic equations are derived to determine the cable lengths for a desired position of the mobile platform 502. Further, there is an analysis of the all positive cable tension condition in order to achieve a static equilibrium of the mobile platform 502, followed by the deduction of the dynamics equations of the system or apparatus. As well, there is a derivation of the overall stiffness matrix of the robotic system and its usefulness to calculate the stabilizable workspace of a cable-based robot around a static equilibrium point.

Figure 3:
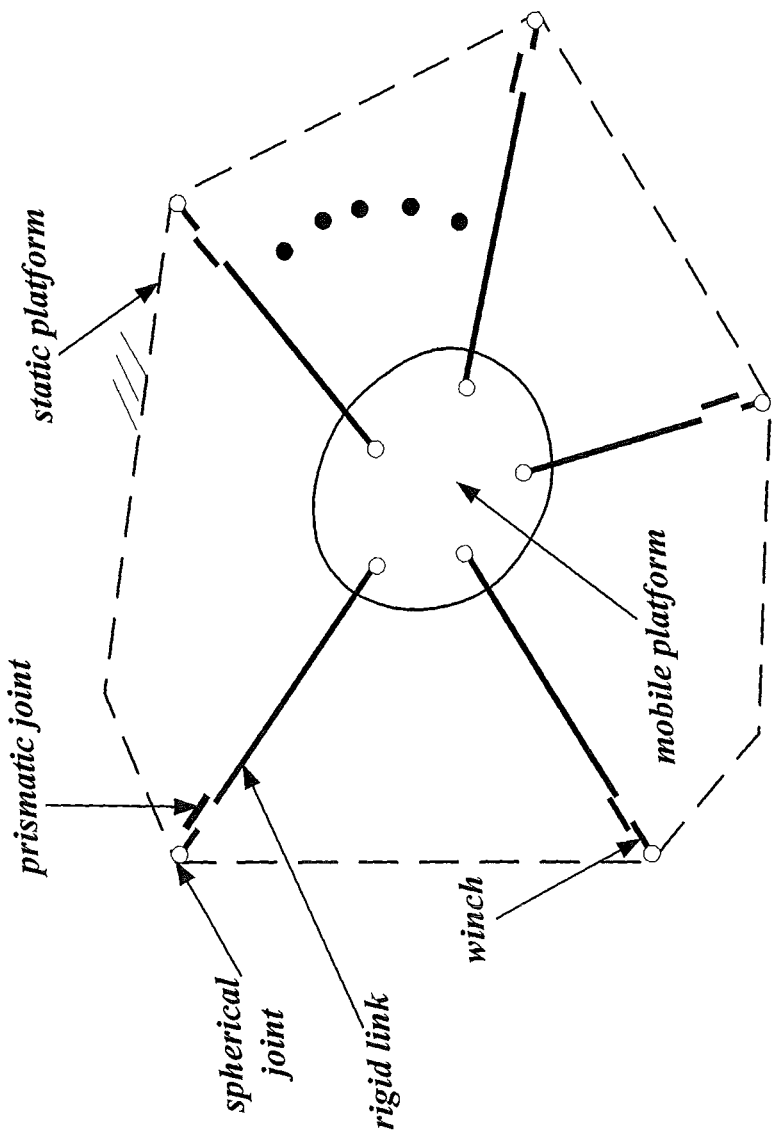
FIG. 3 is a schematic model of the embodiment of FIG. 2.

A model of the above mentioned cable-based robotic system is established. The equivalent model, shown in FIG. 3, is characterized by assuming cables are massless (cables are thin and light), firmly stretched (cable slackness is ignored), and inelastic (any cable's elongation is compensated). In this context, each cable is modeled as a subsystem composed of two rigid moving elements, two spherical joints and one prismatic joint. Therefore, any cable subsystem has six degrees of freedom (DOF) with five restraints to be added to the system to make cable lengths the active joints to control.

Figure 4:
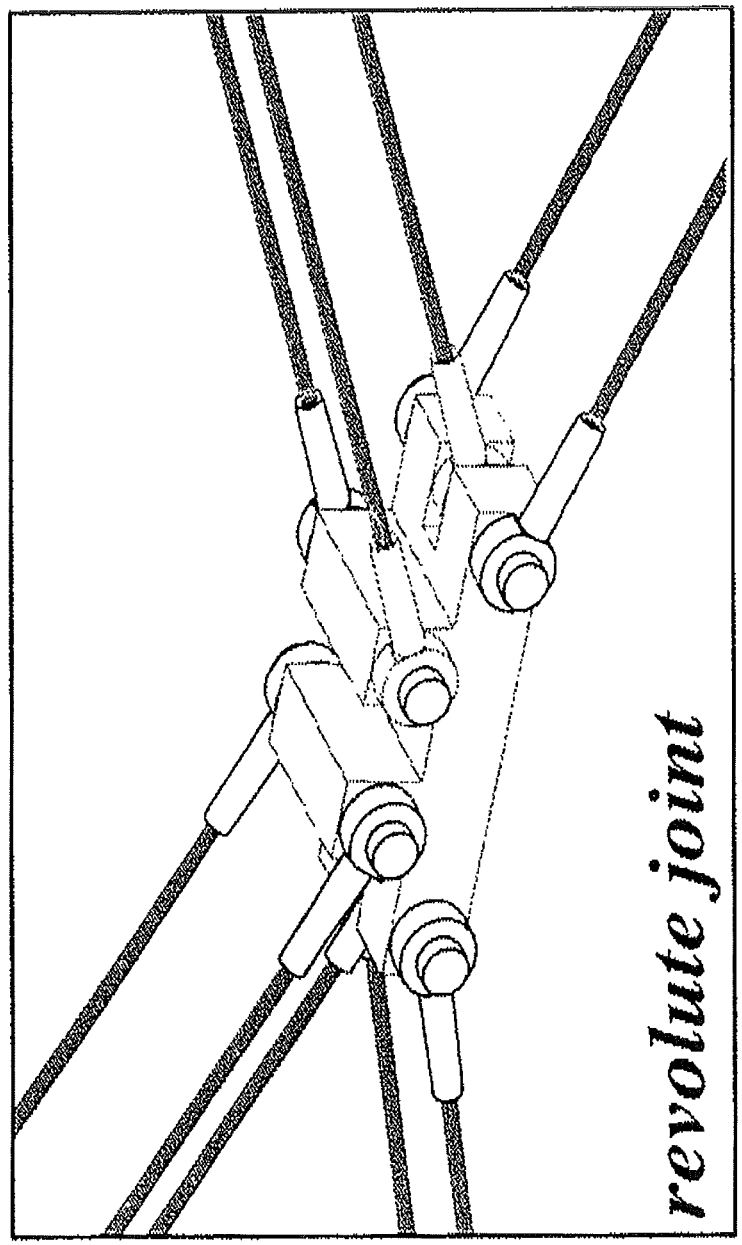
FIG. 4 is a perspective view of a revolute joint.

An equivalent system model, such as shown in FIG. 3, is then composed of 2 m rigid links, one mobile platform, 2 m spherical joints and 1 m prismatic joints where m is the number of cables. Based on Grübler-Kutzbach's formula for spatial motions, the total number of DOF of the system is $n=6(2m+1)-m[2(6-3)+(6-1)]=m+6$ DOF. However, regardless of the number of cables, a spatial mobile platform must have six DOF. This can be obtained by assuming that each cable twist is not affecting the pose of mobile platform; that is, m degrees of freedom can be reduced from the latter result; thus, $n=m+6-m=6$. The same result can be obtained if each spherical joint between the winch and static box is substituted by a universal joint. This approach facilitates the creation of a virtual model in computer software packages. Alternatively, for planar movements (three DOF) of the mobile platform, each spherical joint may be replaced by a revolute joint (such as shown in FIG. 4) whose axis of rotation is be perpendicular to the plane of motion of the apparatus.

Figure 5:
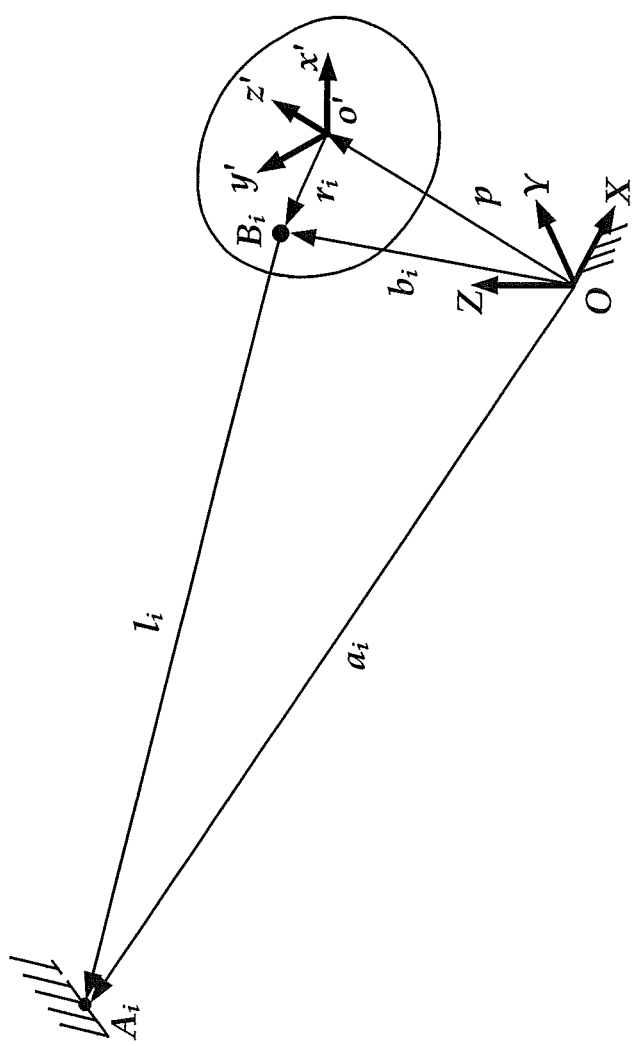
FIG. 5 is a schematic diagram of closure position vectors for cable i in a general spatial m-cable apparatus.

Based on the previous model and assuming a mobile platform with six degrees of freedom, a general kinematic formulation is developed. FIG. 5 shows the closure position vectors for cable i in a general spatial m-cable robot.

A coordinate system x'y'z' is fixed at the mass center of the mobile platform o' and another, XYZ, is fixed at a reference point O. Vector p establishes the position of the mobile platform between these two coordinate systems. Vector $l_i$ is the ith cable vector connecting the anchors points $A_i$ and $B_i$ at the static and mobile platform, respectively. Thus, constant vectors $a_i$ and $r_i'$ are placed with respect to the base and the mobile coordinate systems. Using the transformation $r_i=R_{321}r_i'$, where $R_{321}$ is the rotation transformation matrix with the sequence ZYX of the Euler angles $\theta_p=[\alpha\ \beta\ \gamma]^T$ for the desired orientation of the mobile platform, it becomes:

$$R_{321} = \begin{bmatrix} c(\alpha)c(\gamma) - s(\alpha)s(\gamma)s(\beta) & -s(\alpha)c(\beta) & c(\alpha)s(\gamma) + s(\alpha)s(\beta)c(\gamma) \\ s(\alpha)c(\gamma) + c(\alpha)s(\gamma)s(\beta) & c(\alpha)c(\beta) & s(\alpha)s(\gamma) - c(\alpha)s(\beta)c(\gamma) \\ -c(\beta)s(\gamma) & s(\beta) & c(\gamma)c(\beta) \end{bmatrix}$$

where $R_{321}=R(Z,\alpha)R(X',\beta)R(Y'',\gamma)$ is obtained with the three basic rotation transformation matrices around Z axis, X' axis, Y" axis, and $c(\phi)=\cos(\phi)$ and $s(\phi)=\sin(\phi)$. Then, the mobile platform pose with respect to the reference frame can be denoted as $X_p=[p_X\ p_Y\ p_Z\ \alpha\ \beta\ \gamma]^T$. The closure vector equation for the position of the mobile platform is obtained as:

$$l_i = p + r_i - a_i, \quad \forall i=1,2\ldots m \qquad \text{Equation (1)}$$

The ith cable's length is obtained by applying the 2-norm Euclidian norm to Equation (1) as $$l_i = \|p + r_i - a_i\|, \quad \forall i=1,2\ldots m \qquad \text{Equation (2)}$$

Differentiating (Equation 1) results in $$\dot{l}_i \hat{l}_i + \omega_i \times l_i = v_p + \omega_p \times r_i, \quad \forall i=1,2,\ldots,m \qquad \text{Equation (3)}$$

Equation (3) relates the cable velocities with the mobile box velocities; then, for any ith cable: $\dot{l}_i$ is the rate of change in the length; $\omega_i$ is the angular velocity vector, $\hat{l}_i$ is the cable unitary vector in the reference frame. For the mobile box, $v_p$ and $\omega_p$ are the linear and angular velocities with respect to reference frame. Expressing any cable unitary vector in its Cartesian components results in:

$$\hat{l}_i = \frac{l_i}{l_i} = \frac{l_{iX}}{l_i} + \frac{l_{iY}}{l_i} + \frac{l_{iZ}}{l_i} = \left(\frac{l_{iX}}{l_i}\right)\hat{i}_X + \left(\frac{l_{iY}}{l_i}\right)\hat{i}_Y + \left(\frac{l_{iZ}}{l_i}\right)\hat{i}_Z = [\hat{l}_{iX}\ \hat{l}_{iY}\ \hat{l}_{iZ}]^T$$

Equation (3) may be written as $$\dot{l}_i = \hat{l}_i \cdot (v_p + \omega_p \times r_i - \omega_i \times l_i) = \hat{l}_i \cdot v_p + (r_i \times \hat{l}_i) \cdot \omega_p \qquad \text{Equation 4}$$

$$\dot{l}_i = \hat{l}_i \cdot (v_p + \omega_p \times r_i - \omega_i \times l_i) = \hat{l}_i \cdot v_p + (r_i \times \hat{l}_i) \cdot \omega_p \quad \text{In matrix from}$$

$$\begin{Bmatrix} \dot{l}_1 \\ \dot{l}_2 \\ \vdots \\ \dot{l}_m \end{Bmatrix} = \begin{bmatrix} \hat{l}_{1X} & \hat{l}_{1Y} & \hat{l}_{1Z} & (r_1 \times \hat{l}_1)_X & (r_1 \times \hat{l}_1)_Y & (r_1 \times \hat{l}_1)_Z \\ \hat{l}_{2X} & \hat{l}_{2Y} & \hat{l}_{2Z} & (r_2 \times \hat{l}_2)_X & (r_2 \times \hat{l}_2)_Y & (r_2 \times \hat{l}_2)_Z \\ \vdots & \vdots & \vdots & \vdots & \vdots & \vdots \\ \hat{l}_{mX} & \hat{l}_{mY} & \hat{l}_{mZ} & (r_m \times \hat{l}_m)_X & (r_m \times \hat{l}_m)_Y & (r_m \times \hat{l}_m)_Z \end{bmatrix} \begin{Bmatrix} v_{pX} \\ v_{pY} \\ v_{pZ} \\ \omega_{pX} \\ \omega_{pY} \\ \omega_{pZ} \end{Bmatrix}$$

Equation (4) has the well known form of $$\frac{dl}{dt} = J\frac{dX_p}{dt} \qquad \text{Equation (5)}$$

where J represents the Jacobian matrix. In general, the rank-deficient Jacobian matrix results in geometrical singularities of a robot, frequently related to configurations near the boundaries of the robot workspace and loss of full motion. Thus, for fully constrained cable-based robots (m>n) and supposing all cables are always in tension by the application of positive cable tensions, a non-singular configuration satisfies the condition:

$$\text{rank } J = n, \text{ if } J \in R^{m \times n} \text{ where } n < m. \qquad \text{Equation (6)}.$$

Figure 6:
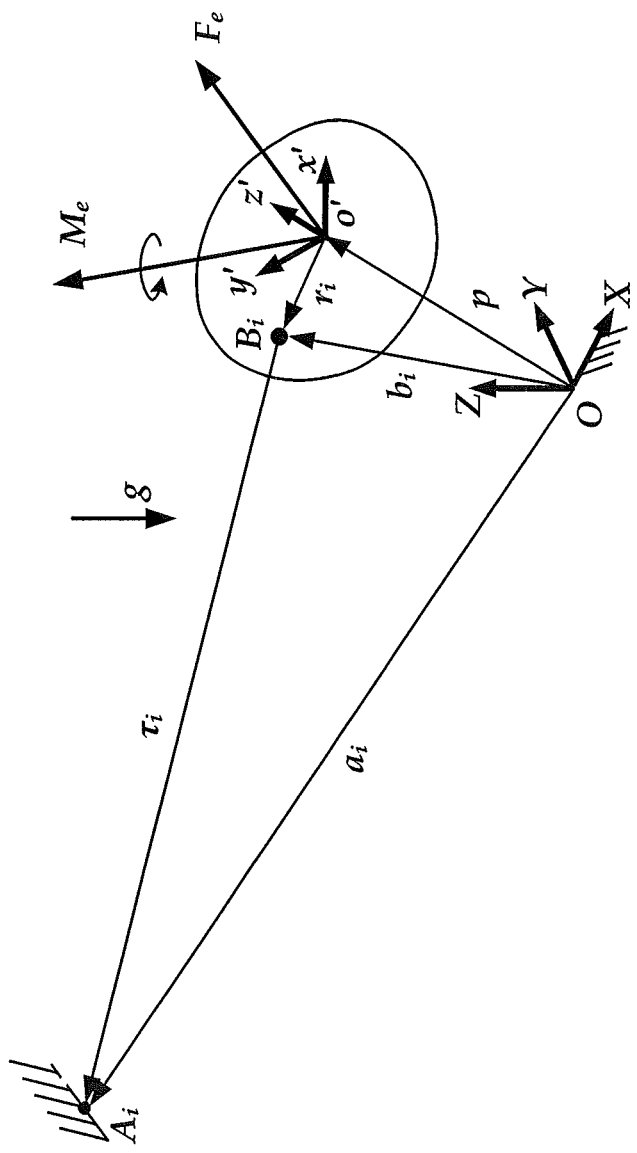
FIG. 6 shows a free-body diagram of a study of the diagram of FIG. 5.
Figure 7:
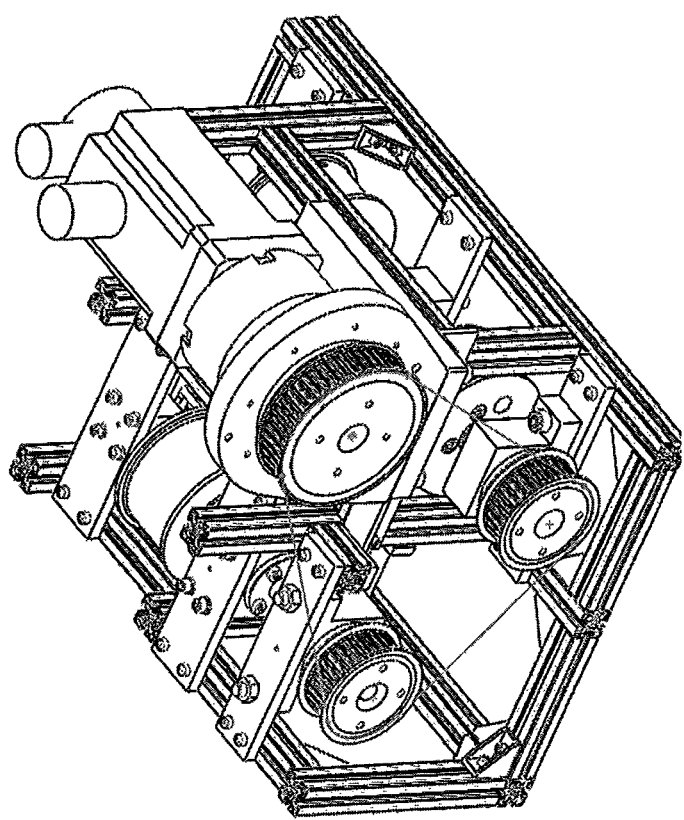
FIG. 7 is a perspective view of a part of a cable controlling mechanism.

The force analysis deals with the problem of finding the forces (cable positive tensions) for a specific equilibrium point of the system. This analysis begins with the static equilibrium followed by a dynamic study by the addition of the translational motion (Newton's equation) and the rotational motion about the mass center (Euler's equation). FIG. 6 shows a free-body diagram of the dynamic study.

In this analysis, the external forces and moments are assumed constant and acting along the center of mass of the mobile platform. Thus, the mobile box static equations are:

$$\sum_{i=1}^{m} \tau_i + F_e + m_p g = 0 \qquad \text{Equation (7)}$$

$$\sum_{i=1}^{m} (r_i \times \tau_i) + M_e = 0 \qquad \text{Equation (8)}$$

where $F_e$ and $M_e$ are the external forces and moments applied to the mobile platform; mp is the mobile platform mass; and g is the gravitational acceleration vector.

As tensions applied to the cables can be written as $\tau_i = -\tau_i \hat{l}_i$; then Equations (7) and (8) can be written as:

$$F_e + m_p g = \sum_{i=1}^{m} \tau_i (\hat{l}_{iX} + \hat{l}_{iY} + \hat{l}_{iZ}) \qquad \text{Equation (9)}$$

$$M_e = \sum_{i=1}^{m} \tau_i [(r_i \times \hat{l}_i)_X + (r_i \times \hat{l}_i)_Y + (r_i \times \hat{l}_i)_Z] \qquad \text{Equation (10)}$$

Assuming the gravitational acceleration is acting along the vertical Z axis, $g=[0\ 0\ -G]^T$. Thus, the matrix form is shown by:

$$\begin{Bmatrix} F_{eX} \\ F_{eY} \\ F_{eZ} - m_p G \\ M_{eX} \\ M_{eY} \\ M_{eZ} \end{Bmatrix} = \qquad \text{Equation (11)}$$

-continued $$\begin{bmatrix} \hat{l}_{1_X} & \hat{l}_{2_X} & \cdots & \hat{l}_{m_X} \\ \hat{l}_{1_Y} & \hat{l}_{2_Y} & \cdots & \hat{l}_{m_Y} \\ \hat{l}_{1_Z} & \hat{l}_{2_Z} & \cdots & \hat{l}_{m_Z} \\ (r_1 \times \hat{l}_1)_X & (r_2 \times \hat{l}_2)_X & \cdots & (r_m \times \hat{l}_m)_X \\ (r_1 \times \hat{l}_1)_Y & (r_2 \times \hat{l}_2)_Y & \cdots & (r_m \times \hat{l}_m)_Y \\ (r_1 \times \hat{l}_1)_Z & (r_2 \times \hat{l}_2)_Z & \cdots & (r_m \times \hat{l}_m)_Z \end{bmatrix} \begin{Bmatrix} \tau_1 \\ \tau_2 \\ \vdots \\ \tau_m \end{Bmatrix}$$

In a compact representation, Equation (11) can be written as:

$$W = A\tau \quad \text{Equation (12)}$$

where $W \in R^n$ is the wrench vector to balance under static equilibrium.

As can be seen, there is a relationship between Equations (4) and (11) as $A = J^T$. Matrix A is called the structure matrix and depends on the parameters of the robot and the pose of the mobile platform. Cable tensions to balance wrench can be found by inverting A ensuring all cable tensions are always positive. However, for fully constrained cable-based robots, the number of cables m is larger than the degrees of freedom n of the mobile platform; in consequence, $A \in R^{n \times m}$ and it may have infinite cable tensions solutions (underdetermined linear system). A free-singular pose of the mobile platform means that condition Equation (6) is satisfied, which results in that A has full row-rank. Assuming the last condition, the solution of Equation (12) can be obtained as:

$$\tau = \tau_w + \tau_o \quad \text{Equation (13)}$$

where $\tau_w \in R^m$ is a solution and $\tau_o \in R^m$ is the homogenous solution. Thus, $A\tau_o = 0$ and $A\tau = A\tau_w + A\tau_o = W$; which indicates that any vector from the null space of A added to $\tau_w$ is a solution of Equation (12). If minimum cable tension solutions are desired in order to reduce the size of the drivers, the pseudoinverse matrix is the most common formulation to use. Then, Equation (13) is given by:

$$\tau = A^\dagger W = (I - A^\dagger A)\beta \quad \text{Equation (14)}$$

where $A^\dagger \in R^{m \times n}$ is called the Moore-Penrose inverse or pseudoinverse of $A \in R^{n \times m}$ where $AA^\dagger A = A$, and $A^\dagger = A^T(AA^T)^{-1}$, and $I \in R^{m \times m}$ is the identity matrix. The first term of (14) represents a vector with the minimum 2-norm solution without considering the cable tension constraints, and therefore the cable tensions might be negative. The second term is an arbitrary vector from the nullspace of A depending on $\beta \in R^m$. Equation (14) can be rewritten as:

$$\tau = A^\dagger W + Nh \quad \text{Equation (15)}$$

where Nh is an arbitrary vector of cable tensions to balance the redundant cables among all the cables without affecting the pose of the mobile platform (internal forces). This vector is used to make all cable tension positive. $N \in R^{m \times (m-n)}$ is the null space or kernel of A, and $h \in R^{(m-n)}$ must be determined such that all cable tensions are positive (minimum requirement). Thus, the problem is reduced to select a criterion to find a unique value(s) of h subjected to $\tau_i \geq 0 \ \forall i = 1, 2 \ldots m$. The latter is called force-closure condition with the assumption that unlimited actuator forces can be applied to the cables in order to support any arbitrary wrench. The force-closure condition is satisfied when the homogenous term of the structure matrix is always strictly positive, that is:

$$\forall N \in \text{null}(A), \exists Nh \in R_+^m, \text{ where } A \in R^{n \times m} \text{ and } n < m \quad \text{Equation (16)}$$

However, in real applications, cable tensions are bounded by lower and upper cable tension limits because lower tension limits maintain cables taut ensuring a minimum overall stiffness of the robot, and upper tension limits avoid excessive deformation of the cables and the use of big actuators. Here, the minimum 2-norm solution is used to select h which minimizes the tensions among all cables while all cable tensions remain bounded; in other words:

$$\min_\tau \|\tau\| \quad \text{Equation (17)}$$

Subjected to $$W = A\tau \text{ and } 0 < \tau_{i,min} \leq \tau_i \leq \tau_{i,max}$$

$$\forall i = 1, 2, \ldots, m.$$

On the other hand, feasible wrenches are those constant static forces/moments applied to the mobile platform that can be balanced by all positive cable tensions, which might be subjected to a set of cable tension limits. Conditions to determine the feasibility of balancing a wrench are as follows:

There is at least a solution to Equation (15) which intersects the convex set delimited by the cable tension limits.

This convex set may be seen as a hyperbox in $R_+^m$. Equation (18)

Then, two infeasible wrench situations can occur; the inability of a certain pose of the mobile platform to satisfy the force-closure condition and the impossibility of finding a set of cable tensions to fulfill the set of cable limits for a given wrench applied to the mobile platform. These conditions can be used to generate different workspaces.

The system dynamics model is derived by assuming that cables are massless and straight. Also, the nonlinear effect of friction is ignored to reduce the dynamic equations' complexity. In that sense, the Newton-Euler's equations of the mobile platform are obtained by:

$$\sum_{i=1}^m \tau_i + F_e + m_p g = m_p \dot{v}_p \quad \text{Equation (19)}$$

$$\sum_{i=1}^m (r_i \times \tau_i) + M_e = I_p \cdot \dot{\omega}_p + \omega_p \times (I_p \cdot \omega_p) \quad \text{Equation (20)}$$

where $I_p$ is the inertial tensor of the mobile platform about its mass center in the reference coordinates; $\dot{v}_p$, $\dot{\omega}_p$ are the linear and the angular acceleration of the mobile platform, respectively. In a compact form, Equations (19) and (20) can be rewritten by:

$$M\ddot{X}_p + C - W = A\tau \quad \text{Equation (21)}$$

where $$M_{n \times n} = \begin{bmatrix} (m_p 1)_{n_T \times n_T} & 0_{n_T \times n_R} \\ 0_{n_R \times n_T} & (I_p)_{n_R \times n_R} \end{bmatrix}$$

is the inertial matrix, $n_T$ and $n_R$ are the number of translational and rotational DOF of the mobile platform, respectively, such that $n = n_T + n_R$; $(\ddot{X}_p)_{n \times 1} = [(\dot{v}_p)_{n_T \times 1} (\dot{\omega}_p)_{n_R \times 1}]^T$ is the acceleration vector of a mobile platform pose;

$C_{n\times 1} = [0_{n_T\times 1} \ (\lfloor\omega_p\times\rfloor(I_p\omega_p))_{n_R\times 1}]^T$ is the Coriolis and centrifugal forces and torques vector, where $\lfloor\omega_p\times\rfloor$ means the cross product operator; $W_{n\times 1} = [(F_e+m_p g)_{n_T\times 1} \ (M_e)_{n_R\times 1}]^T$ is the wrench vector to balance under dynamic equilibrium; and $A\tau$ has the same meaning as Equation (11).

Stiffness modelling allows knowing whether the mobile platform is stabilizable, thus avoiding erratic motions and lack of system control. The overall stiffness formulation of an apparatus is based on the elastic properties and tensions of cables, considering the mobile platform and the actuators as rigid elements. Thus, the stiffness matrix relates the infinitesimal changes of external forces and moments applied to the mobile platform and the linear and rotational small displacements of the mobile platform. Applying derivatives to Equation (12) with respect to a pose of the mobile platform $X_p$, the stiffness matrix is obtained as:

$$K = \frac{dW}{dX_p} = \frac{d}{dX_p}(A\tau) = \frac{d}{dX_p}(J^T\tau).$$

Then:

$$K = \frac{dJ^T}{dX_p}\tau + J^T\frac{d\tau}{dX_p}.$$

The term $$\frac{d\tau}{dX_p}$$

can be written as:

$$\left(\frac{d\tau}{dl}\right)\left(\frac{dl}{dX_p}\right) = [\text{diag}(k_1, \ldots, k_m)]J$$

Thus, $$K = \frac{dJ^T}{dX_p}\tau + J^T[\text{diag}(k_1, \ldots, k_m)]J$$

Using a four-spring model, the stiffness of a cable-based robot can be expressed as:

$$K = K_\tau + K_k \quad \text{Equation (22)}$$

where $K_\tau$ is the stiffness matrix as a consequence of the tensions applied to the cables, and $K_k$ is the stiffness matrix resulting from cable stiffness. The stiffness matrices can be expressed as:

$$K_\tau = \sum_{i=1}^{m} \frac{\tau_i}{l_i} \begin{bmatrix} 1 - \hat{l}_i\hat{l}_i^T & (1 - \hat{l}_i\hat{l}_i^T)[r_i\times]^T \\ [r_i\times](1 - \hat{l}_i\hat{l}_i^T) & [r_i\times](1 - \hat{l}_i\hat{l}_i^T)[r_i\times]^T - [\hat{l}_i\times][r_i\times]^T \end{bmatrix}$$

$$K_k = \sum_{i=1}^{m} k_i \begin{bmatrix} \hat{l}_i\hat{l}_i^T & \hat{l}_i\hat{l}_i^T[r_i\times]^T \\ [r_i\times]\hat{l}_i\hat{l}_i^T & [r_i\times]\hat{l}_i\hat{l}_i^T[r_i\times]^T \end{bmatrix}$$

where $k_i$ is the ith cable stiffness; $[r_i\times]$ means the cross product operator, and I is the identity matrix. A sufficient condition for the stabilizability of a cable-based robot is that the stiffness matrix must be positive definite.

The robot stiffness matrix is used to map the deflections of the mobile platform with respect to a set of the applied forces/moments. Alternatively, robot natural frequencies can be used as another measure for robot's design. Assuming no damping, the natural frequencies of the robot are obtained from:

$$(f_{n_q})_{X_p} = \frac{\sqrt{\text{eig}_q(M^{-1}K_{X_p})}}{2\pi}[\text{Hz}] \quad \text{Equation (23)}$$

where $K_{X_p}$ is the robot stiffness matrix at a particular pose $X_p$ of the mobile platform, $\text{eig}_q(M^{-1}K_{X_p})$ is the qth eigenvalue and $(f_{n_q})_{X_p}$ is the qth natural frequency at a particular pose of the mobile platform.

Consequently, a design optimization problem can be formulated with respect to a performance index; for example, the fundamental frequency (minimum natural frequency), must be maximized in the overall robot workspace (V) in order to enhance the robot stiffness subjected to the positive cable tension constraints; that is:

$$\max_D\left\{\min_{X_p\in V} f_{n_q}(D, X_p)\right\} \quad \text{Equation (24)}$$

Subjected to $\tau_{min} \leq \tau_i \leq \tau_{max}$ $\forall \ i = 1, 2, \ldots, m$ cables where D is the design parameters vector which has a relevant influence on the robot stiffness; $\tau_{min}$ is the minimum cable tension; $\tau_{max}$ is the maximum tensions, and $\tau_i$ is the tension in the ith cable.

The workspace of the apparatus may be obtained by scanning every possible position of the mobile platform 502 and applying the equations listed above. Then, any criteria can be successively added, such as gravity, external forces/moments, and stiffness. The following algorithm is implemented in a MATLAB™ program to calculate the cable tensions and workspace of a cable-based robot.

1. Input of robot parameters and selection of a criterion (force-closure or feasible-wrench).

2. For each position of the mobile platform:

2a. Check free-singularity condition using (6). If it is satisfied, go to 2b, otherwise go to 2e.

2b. Case 1: (Force-closure condition) Given any arbitrary wrench, find all cable positive tensions with unbounded maximum tension. Check force-closure condition with Equation (16). If there exists such condition, find cable tensions with Equation (17) and go to 2c; otherwise go to 2e.

2b. Case 2: (Positive feasible-wrench condition) Given a constant static wrench, find all cable positive tensions with bounded maximum tension. Check feasibility condition with Equation (18). If there exists such condition, find cable tensions with Equation (17) and go to 2c; otherwise go to 2e.

2b. Case 3: (Feasible-wrench condition) Given a constant static wrench, find all cable positive tensions subjected to a set of bounded cable tensions (minimum and maximum tensions) with Equation (17). Check feasibility condition. If there exists such condition, go to 2c; otherwise go to 2e.

2c. Calculate the overall stiffness matrix with Equation (20). Check the stiffness matrix is a definite positive matrix. If there exists such condition go to 2d, otherwise go to 2e.

2d. Mark this position as part of the positional workspace of the cable-based robot.

2e. End of the loop: if there exists more positions to check, go to 2a; otherwise End.

This algorithm analyzes each position of the mobile platform inside the static workspace. Given the parameters of the cable-based robot, the Jacobian matrix is obtained by using Equation (4); then, the null-space of the transposed Jacobian matrix is used to calculate the tensions of all cables.

Figure 8B:
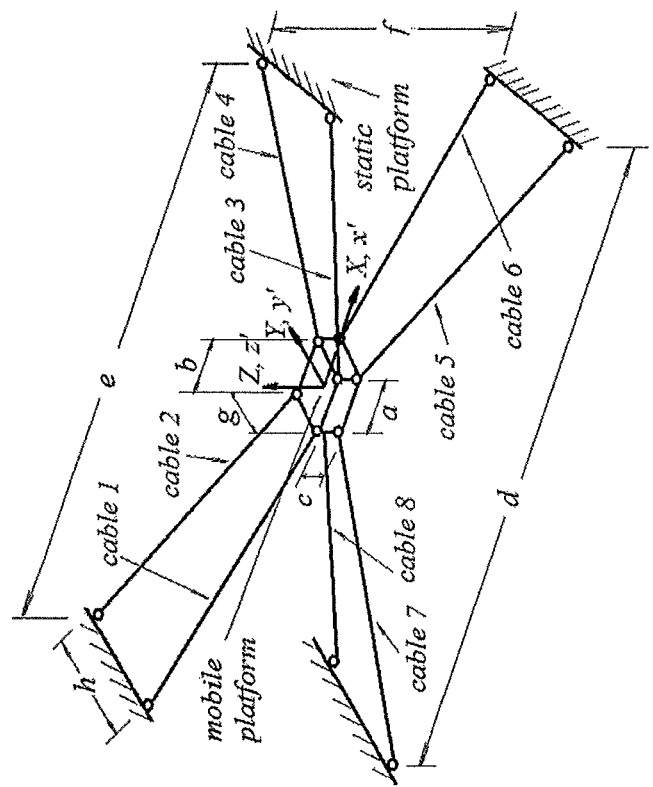
FIGS. 8a and 8b are further embodiments of a cable system for use in an apparatus for controlling a mobile platform.
Figure 8A:
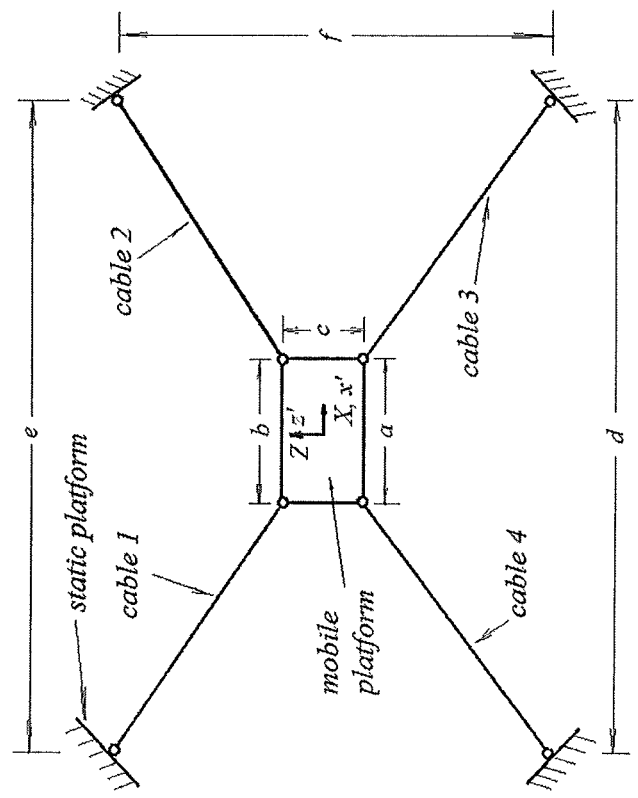

To study kinematic constraints and parallelograms, the planar four-cable robot shown in FIG. 8(a) is considered first, and then the kinematic constraints and parallelograms are applied to the spatial eight-cable robot shown in FIG. 8(b).

Figure 9C:
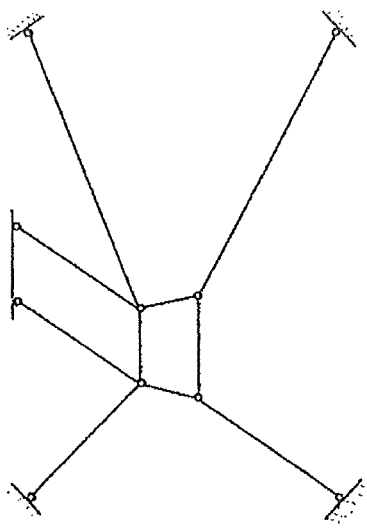
FIGS. 9a to 9c are further embodiments of a cable system for use in an apparatus for controlling a mobile platform.

A planar robot with m number of cables has $n=3(2m+1)-3m(3-1)=3$ degrees of freedom, one of them rotational. A pure translational mobile platform can be obtained by adding to the system at least one parallelogram (minimum condition), as is shown in FIG. 9a. Assuming the distances $\overline{P_1P_2}$ and $\overline{P_3P_4}$ are the same, a parallelogram is developed between cables two and three. This parallelogram provides for parallelism between the sides $\overline{P_1P_4}$ and $\overline{P_2P_3}$, resulting in a fixed orientation motion of the mobile platform. In consequence, this design has $n=3-1=2$ translational DOF. Thus, for this design a minimum of 3 motors are needed to make a fully constrained robot or a constraint robot. For this embodiment however, four motors are used to control the position of the mobile platform and maintaining positive tensions in the cables and identical lengths for cables 2 and 3. The pair of cables in the parallelogram are ideally collected/released by using the same drum so that the equal cable lengths condition is maintained. This design possesses the necessary condition (one parallelogram) to provide purely translational motions; however, other possible candidates can be developed by considering other constraints.

Figure 9B:
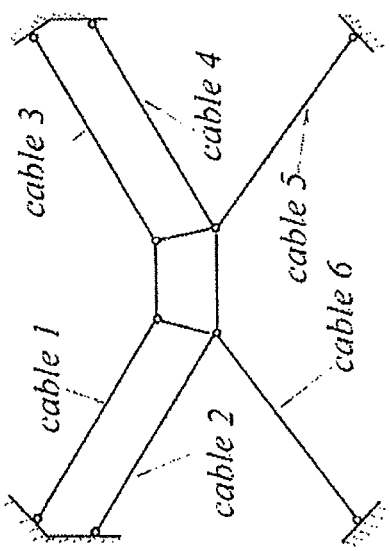
Figure 9A:
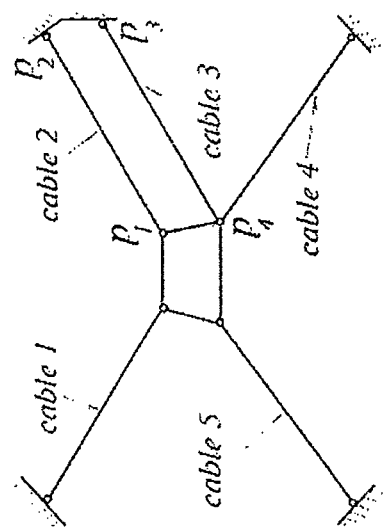

The embodiment of FIG. 9b utilizes an extra parallelogram, which might result in a symmetrical design actuated by four motors. In contrast, the embodiment of FIG. 9c, uses only one parallelogram with four other single cable. Other embodiments, for example one similar to that in FIG. 9a with only one cable in the bottom will also have two translational degrees of freedom however, its workspace, as discussed earlier, may not be the same as the one in FIG. 9a and it will likely be smaller.

The evaluation of these designs results in certain differences. The embodiment of FIG. 9a is simpler than that of FIG. 9b because less components are required, however, its asymmetry might affect the appropriate cable tensions balance. This problem may be reduced in the symmetrical design of FIG. 9b with the addition of an extra pair of cables working as a parallelogram. These designs use the same number of motors and might have similar workspaces. On the other hand, the embodiment of Figured 9c uses four single cables and one parallelogram. This configuration might allow an expansion of the workspace and a better distribution of a payload among all the cables. Nevertheless, these advantages are possible with the additional cost of one extra motor to the apparatus. As will be understood, while many number of constraints may be added, the determination of how many will be scenario specific with respect to different factors. However, the introduction of a constraint to an apparatus for controlling a mobile platform provides improved control of the platform.

By reviewing the symmetrical embodiments (FIG. 9b), it is noted that symmetrical geometries may result in fully-isotropic robots. In other words, the same performance of the robot can be achieved in any position of its workspace.

The addition of kinematic constraints such as parallelograms in the planar embodiments discussed above can be extended to three dimensional embodiments to eliminate the motion of the moving platform in the undesired direction. For example, in the warehousing robot that two translational motions (vertical and horizontal) are needed for the platform, kinematic cable constraints in the form of parallelograms can be added to the design to improve the control and rigidity of the platform motion.

FIG. 10 is a perspective view of a 3D embodiment of apparatus for controlling movement of a mobile platform which relates to the symmetrical embodiment of FIG. 9b. The upper winches (which may form part of the cable controlling mechanisms) pull/recollect two parallelograms composed of three cables, and the bottom winches (which may form part of the cable controlling mechanisms) pull/recollect other two parallelograms composed of two cables. The drive units are attached to the static platform. Each drive unit uses a motor which is connected to the spools' shafts in order to control the cable lengths.

The selection and design of kinematic cable constraints can be done by analyzing the workspace and stiffness of the moving platform.

Several methods to quantify, qualify, expand, and design cable-based robot workspaces have been developed. For example, there are different definitions of workspaces for cable-based robots assuming that the cables are massless and straight. Two groups of workspace can be identified: static and dynamic. A static workspace is a particular case of the dynamic workspace, where accelerations of the mobile box can be assumed to be small, and thus, quasi-static motion analysis is valid. Works related to dynamic workspaces where the dynamic effects of the cables and motors are neglected and only the inertial effects of the mobile box for a given set of accelerations are included. Workspace analysis methods can be identified by the inclusion of the following criteria: kinematic and force singularities, external wrenching applied to the mobile box, stiffness, interference, and gravitational force. Thus, several shapes and sizes of workspaces can be identified and depicted. The process of selecting an appropriate criterion may be reduced by identifying the existing correlation between the workspace with the type of cable-based robot and the task to be accomplished. Moreover, depending on the type of criterion selected, it is possible to propose changes in the configuration of a cable-based robot and its kinematic constrains or parallelograms in order to expand its workspace. It has been suggested that starting the workspace analysis with the force singularity condition (wrench-closure workspace); that is, the identification of all possible mobile-box poses where cable tensions are bounded by predefined minimum and maximum tension values. Then, any of the above mentioned criteria can be added.

An appropriate definition for the workspace of a cable-based robot can be established as a set of all poses of the mobile box subjected to a given external wrench (force/torque), which must be balanced with positive bounded cable tensions and might include one of the following limitations: geometric free-singularity configurations, enough structural rigidity and free-collision cable configurations. This analysis can be done with a discretization approach, follow by a continuous approach for verification purposes. Discrete approaches are based on a grid resolution of the area or volume, and therefore, each pose of the mobile box must be analyzed. In contrast, continuous approaches use analytical techniques to generate the whole workspace of a cable-based robot; for instance, one may use convex analysis to develop closed form expressions to define the workspace boundaries of planar and spatial robots; however, these results are based on unbounded positive cable tensions.

Including a desired stiffness in the workspace is another additional criterion. A stable workspace may be mapped by including the antagonistic forces in the overall stiffness model. The enhancement of stiffness maintaining an optimal cable tension distribution may also be analyzed. Further, different anchor points of a large-scale fully constrained cable-based robot by mapping the fundamental natural frequency in the wrench-closure workspace may also be analyzed.

The objective of a cable-based robot's control is to adjust the length (position control) and tension (force control) of each actuated cable for a desired pose or trajectory of a mobile platform subjected to external disturbances (forces/moments). Several disturbance types can be modeled such as static, impulsive, random and cyclical, and where they are located (actuators, cables, mobile box and anchor points). However, static and punctual disturbances located in the mobile box (or platform) and the actuators are the more common models, assuming the cables are massless. Static disturbances are constant wrenches, for instance, an invariable object weight. On the other hand, impulsive disturbances happen when wrench values suddenly change, for example, during a sharp acceleration.

The use of cables as described above as parallelogram constraints is intended to reduce or eliminate undesired degrees of freedom and hence, the number of motors, and increase the stiffness of the apparatus in constrained direction.

The mobile platform can carry different cable controlling mechanisms or other robotic arms to pick up or drop off parts from shelves to conveyors or vice versa.

The mobile platform can be equipped with a camera, scanner, or other types of sensors to find a desired location or shelf and position itself accurately with respect to the shelf or desire location.

In the preceding description, for purposes of explanation, numerous details are set forth in order to provide a thorough understanding of the embodiments. However, it will be apparent to one skilled in the art that these specific details may not be required. In other instances, some structures may be shown in block diagram form in order not to obscure the understanding. For example, specific details are not provided as to whether aspects of the embodiments described herein are implemented as a software routine, hardware circuit, firmware, or a combination thereof.

In some cases, embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments use cables designed to constrain the motion of the mobile platform to horizontal and vertical motion. The cables are designed to reduce or prevent the undesirable rotational and translational motions of the mobile platform in the form of parallelograms or other kinematic constraint configurations.

The above-described embodiments are intended to be examples only. Alterations, modifications and variations can be effected to the particular embodiments by those of skill in the art without departing from the scope of intended protection.

What is claimed is:

1. An apparatus for controlling movement of a platform comprising:
    a platform;
    a set of cable controlling mechanisms;
    a set of cables extending from the platform, each of the set of cables being attached at a first end to the platform and at a second end to one of the set of cable controlling mechanisms; and
    a set of motors for controlling the set of cables;
    wherein the set of cables are connected to the platform in more than one plane at different locations within each plane, the more than one plane including a top plane and a bottom plane;
    wherein the more than one plane are horizontally parallel to each other;
    wherein the set of cables provide a kinematic constraint to control of the platform; and
    wherein a number of motors in the set of motors controlling the set of cables connected to the top plane is less than a number of cables in the set of cables connected to the top plane.

2. The apparatus of claim 1 wherein the kinematic constraint comprises at least two of the set of cables forming a kinematic constraint.

3. The apparatus of claim 2 wherein the kinematic constraint is at least of two of the set of cables being parallel with each other and having a same length.

4. The apparatus of claim 2 wherein the at least two of the set of cables are connected to a same cable controlling mechanism.

5. The apparatus of claim 4 wherein the same cable controlling mechanism comprises:
    a number of tools equal to a number of the at least two of the set of cables; and
    a single rotary motor for controlling the tools in the same cable controlling mechanism.

6. The apparatus of claim 2 wherein the at least two of the set of cables are connected to different ones of the set of cable controlling mechanisms.

7. The apparatus of claim 6 wherein the different ones of the set of cable controlling mechanisms are controlled by a single rotary motor.

8. The apparatus of claim 1 wherein each of the set of cable controlling mechanisms comprises:
    at least one tool for receiving the second end of at least one cable of the set of cables; and a single rotary motor for controlling tension and slack in the at least one cable connected to the tool.

9. The apparatus of claim 8 wherein the tool comprises:
a pulley system for guiding the at least one cable; and
a drum for collecting or releasing the at least one cable based on rotation of the rotary motor.

10. The apparatus of claim 9 wherein the pulley system comprises a mechanical spool system.

11. The apparatus of claim 1 further comprising a central processing unit.

12. The apparatus of claim 11 wherein the central processing unit determines how a length of each of the set of cables is controlled based on a desired position of the platform.

13. The apparatus of claim 11 wherein the central processing unit determines how a tension of each of the set of cables is controlled based on a desired position of the platform and positive tensions in the cables.

14. The apparatus of claim 1 wherein the set of cable controlling mechanisms is at least equal to the number of degrees of freedom of the platform.

15. The apparatus of claim 14 wherein a number of the set of cable controlling mechanisms equal to the number of degrees of freedom of the platform are used for controlling lengths of the set of cables.

16. The apparatus of claim 15 wherein a remainder of the set of cable controlling mechanisms are used to apply tension to the set of cables.

17. The apparatus of claim 1 wherein each of the more than one plane are parallel to a surface of the platform for receiving an object.

18. The apparatus of claim 1 wherein one subset of the set of cables is connected at a top horizontal plane and another subset of the cables is connected at a bottom horizontal plane.

19. The apparatus of claim 18 wherein the subset of cables connected to the bottom horizontal plane are for handling tension in the apparatus.

* * * * *